June 28, 1938.　　　　B. L. BIXBY　　　　2,122,194
AUTOMATIC WELDING TORCH
Filed June 25, 1937　　　2 Sheets-Sheet 2
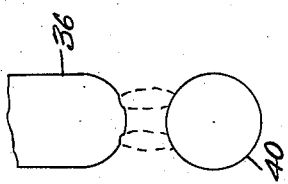
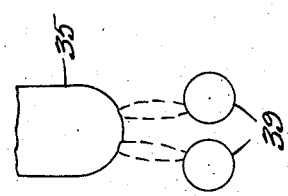
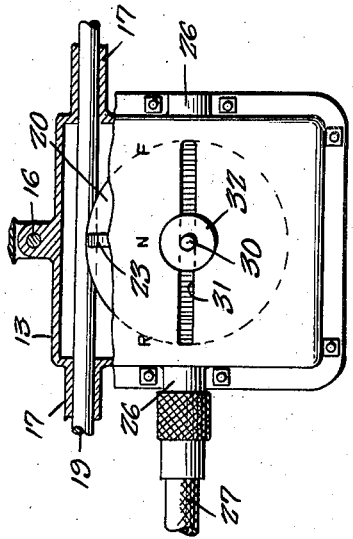
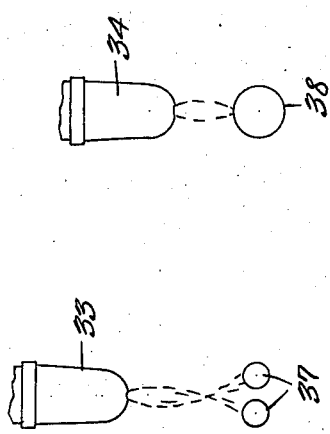
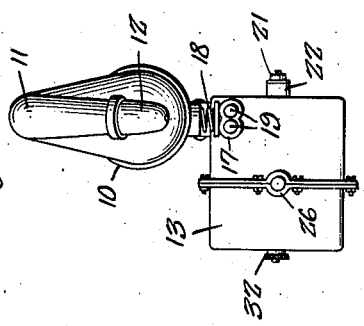
B. Lawrence Bixby,
INVENTOR Patented June 28, 1938

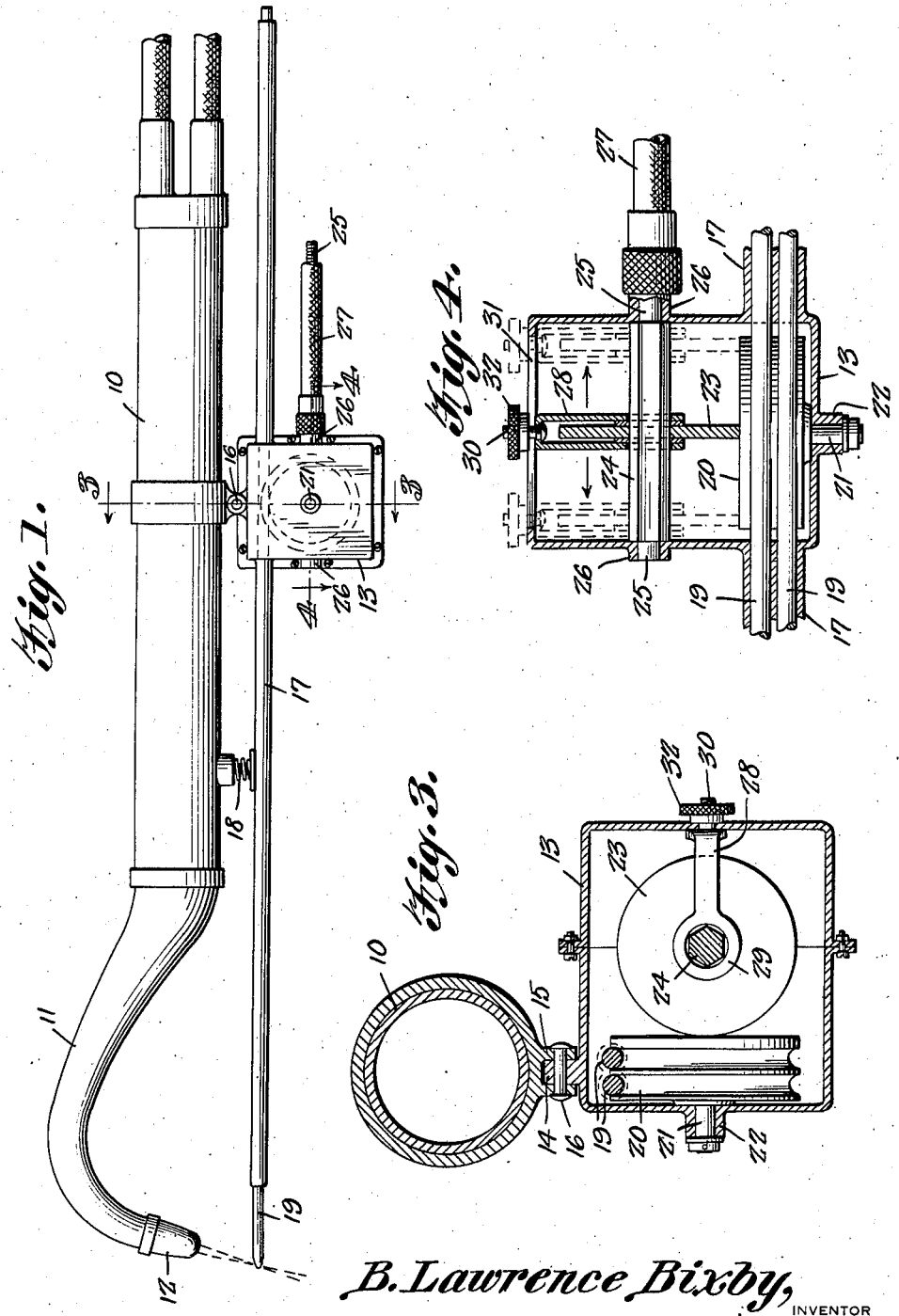

2,122,194

UNITED STATES PATENT OFFICE 2,122,194

AUTOMATIC WELDING TORCH

Butler Lawrence Bixby, Buffalo, N. Y., assignor of one-tenth to Edward H. Wright, Olean, N. Y.

Application June 25, 1937, Serial No. 150,407

1 Claim. (Cl. 113—59)

This invention relates to welding torches and has for an object to provide an automatic welding torch which will cut the cost of both fuel and welding rod as well as decrease human fatigue, and produce better work.

Production welders are not able to produce a sufficient amount of good work in proportion to the amount of fuel and welding rod used because of faulty control of the two elements which enter into welding, namely, a welding rod and a welding flame. Both must be applied simultaneously as the melting point on the metal to be welded, is reached. Intense mental, visual and manual concentration is necessary if maximum speed and efficiency are to be realized. Welders are efficient in direct proportion to their ability to concentrate upon the coordination of both hands and eyes in controlling the two elements used in the operation, the welding rod and welding flame.

With this in mind it is another object of the invention to eliminate a large part of the necessary concentration of hand and eye by the provision of means by which the welding rod will be automatically fed, in a predetermined path, to the apex of the flame, thus releasing the left, or rod holding hand, from the constant demand for coordination with the right, or torch hand, of the operator.

A further object of the invention is to provide an automatic welding torch having an adjustable speed control for feeding the welding rod, the same responding effectively and gently upon demand so that a large part of the human element will be eliminated from the welding operation, thus speeding up the operation, decreasing fuel consumption and amount of rod consumed, and producing a smooth and more uniform application of metal so that the customary grinding and buffing will no longer be necessary.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a side elevation of an automatic welding torch constructed in accordance with the invention.

Figure 2 is a front elevation of the torch shown in Figure 1.

Figure 3 is an enlarged cross sectional view taken on the line 3—3 of Figure 1 and showing the grooved welding rod feeding pulley and friction drive disc for feeding the welding rod through the rod guides.

Figure 4 is a longitudinal sectional view taken on the line 4—4 of Figure 1 showing the means for adjusting the friction drive disc radially of the rod feeding pulley.

Figure 5 is an enlarged side elevation of the housing of the mechanism and showing the welding rod guides broken away.

Figure 6 is a diagrammatic view showing the flame being directed upon two welding rods placed side by side.

Figure 7 is a diagrammatic view showing the flame being directed upon one welding rod.

Figure 8 is a diagrammatic view showing two flames being directed upon two welding rods.

Figure 9 is a diagrammatic view showing two flames being directed upon a single welding rod of large diameter.

Referring now to the drawings in which like characters of reference designate similar parts in the various views, 10 designates a combined handle and torch chamber of a conventional torch, 11 the torch head and 12 the torch tip.

In carrying out the invention a two-piece metal housing 13 is provided with a hinge lug 14 through which, and hinge lugs 15 on the torch handle 10, a hinge pintle 16 is passed. A pair of tubular welding rod guides 17 project in alignment from opposite sides of the housing near the hinge connection with the torch handle. A helical spring 18 is interposed between the torch handle and the forward guide 17 to facilitate action of the hinge as the welding rod is pressed with desired pressure against the work to vary the distance between the rod and tip 12 of the torch.

In one embodiment of the invention two welding rods 19 are used so that two bores will be formed in the guides, as best shown in Figure 4. A rod feeding pulley 20 is provided with a stub shaft 21 which is journaled in a bearing 22 formed on the housing. The pulley is circumferentially grooved to receive both welding rods 19 and support the rods in the housing at a point midway between the guides 17. The rod feeding pulley is a loose pulley and is driven by a friction disc 23 which is mounted to rotate on an axis intersecting the axis of rotation of the pulley at a right angle, as best shown in Figure 3.

The drive disc is fixed to a drive shaft 24 which is preferably hexagon shape in cross section and is received in a similar shaped central opening in the disc. The shaft is provided at the ends with gudgeons 25, best shown in Figure 4, which are rotatably received in bearings 26 formed on the walls of the housing. A flexible drive cable 27 is connected to one end of the shaft and this cable may be actuated from any suitable source of power to rotate the shaft.

The friction drive disc has three positions, namely, a forward feeding position, a neutral feeding position, and a reverse feeding position. It is moved from one of these positions to the other by a yoke 28 which straddles the disc. The branches of the yoke are provided with circular heads 29 which loosely encircle the shaft 24. The bight of the yoke is equipped with a screw 30, best shown in Figure 4, which projects through a slot 31 in the wall of the housing, as best shown in Figure 5. The screw is equipped with a nut 32 which may be tightened against the wall of the housing to locate the friction disc in any desired position, as for example in neutral position at the center of the face of the pulley 20, as shown by full lines in Figure 4, or to the right or left of the center in forward or reverse driving positions.

In practice the rod guides hold the two welding rods in parallel relation and substantially one-sixteenth of an inch from each other at the point of contact with the apex of the flame, the flame striking with its apex squarely between the welding rods. The nut 32 and yoke 28 constitute a drive disc adjusting means and the nut may be left sufficiently loose so that the operator may slide the friction drive disc 23 longitudinally of the drive shaft to engage the pulley 20 so as to progressively vary the speed of feeding of the welding rod to suit various conditions of service, during the welding operation.

Figures 6 to 9 inclusive illustrate diagrammatically charges in the tips 33, 34, 35 and 36 of torches to respectively project the flame direct upon a pair of welding rods 37, or upon a single welding rod 38, or to direct two flames against a pair of welding rods 39, or to direct two flames against a single large welding rod 40.

From the above description it is thought that the construction and operation of the invention will be fully understood without further explanation.

What is claimed is:

In an automatic welding torch, the combination with a torch including a combined handle and torch chamber, a torch head, and a torch tip, of a casing hinged to one side of the handle at about the center thereof, guide tubes projecting in alignment from the casing and extending longitudinally of the handle for slidably receiving a welding rod, a rod feeding grooved pulley in the casing extending into the space between the guide tubes for frictionally engaging the rod and feeding the same toward the torch tip, a drive shaft journaled in the casing laterally of the pulley, a friction disc on the drive shaft engaging one face of the pulley, the drive shaft having angularly disposed faces engaging correspondingly disposed faces in an axial opening formed in the drive disc to permit of the drive disc being rotated by the shaft and to be slid longitudinally of the shaft, there being a slot in the wall of the casing, a shift yoke connected to the disc for adjusting the position of the disc longitudinally of the shaft, a screw carried by the shift yoke projecting through said slot for moving the yoke, a nut on the screw exposed exteriorly of the casing within convenient reach of the operator's hand, the arrangement being such that the nut may be readily manipulated by one of the operator's hands while the other hand is holding the torch handle in order to shift the friction disc to engage the center of the feeding pulley in neutral position or to engage the face of the pulley on either side of the center of the pulley to rotate the pulley forwardly or backwardly, and means for attaching a flexible driving shaft to one end of said feeding shaft for driving the feeding shaft.

B. LAWRENCE BIXBY.